United States Patent [19]

Chang

[11] Patent Number: 5,165,242

[45] Date of Patent: Nov. 24, 1992

[54] REFRIGERATOR OR AIR CONDITIONER BASED ON A MAGNETIC FLUID

[75] Inventor: David B. Chang, Tustin, Calif.

[73] Assignee: Hughes Aircraft Company, Los Angeles, Calif.

[21] Appl. No.: 659,668

[22] Filed: Feb. 25, 1991

[51] Int. Cl.$^5$ .............................................. F25B 21/00
[52] U.S. Cl. .......................................... 62/31; 62/467; 165/96
[58] Field of Search .......................... 62/3.1, 467; 55/2; 165/96

[56] References Cited

U.S. PATENT DOCUMENTS 3,448,791  6/1969  Clark ........................................ 62/3.1

*Primary Examiner*—Ronald C. Capossela
*Attorney, Agent, or Firm*—Michael W. Sales; Wanda K. Denson-Low

[57] ABSTRACT

A refrigeration apparatus employing a working fluid of magnetic dipoles. The apparatus exploits a phase change in the working fluid from unaligned magnetic dipoles to aligned magnetic dipoles, so that no compression of the fluid is required. In a first embodiment, alignment is achieved by judicious application of RF fields tuned to the resonance frequency of the dipoles. In a second embodiment, alignment and randomization of orientation is achieved by operating always below the Curie temperature, and using geometry of the fluid conduit to permit or disallow the formation of a self aligning magnetic field. In both embodiments, the aligned portion of the fluid flow corresponds to the compressor-radiator-expansion valve poriton of the conventional cycle, and the unaligned portion corresponds to the vapor portion of the conventional cycle.

20 Claims, 2 Drawing Sheets

REFRIGERATOR OR AIR CONDITIONER BASED ON A MAGNETIC FLUID

BACKGROUND OF THE INVENTION

The present invention relates to refrigeration apparatus which employs a working fluid comprising magnetic dipoles in suspension.

Conventional refrigeration apparatus employ working fluids which change states between vapor and liquid. Such apparatus employ compressors to compress the fluid. The fluid typically is a chlorinated fluorocarbon ("CFC") such as freon. Recent environmental concerns have led industry to search for alternatives to CFC-based apparatus.

A conventional compression refrigerator/air conditioning apparatus 10 is depicted in FIG. 1. The apparatus 10 comprises a heat exchanger 15 which exchanges heat with the region to be cooled, a compressor 16, a radiator for exchanging heat with the ambient, and an expansion valve 18. These elements are connected by fluid conduits creating a closed loop.

The conventional apparatus 10 operates in the following manner. In region 11, a cool vapor approaches the region to be cooled. In region 12, the vapor is warm because it has absorbed heat from the region to be cooled. In region 13, the vapor/liquid is hot because it has been compressed by compressor 16, and the heat of condensation has gone into heat. In region 14, the liquid is somewhat cooler because it has given up its heat to the ambient via the radiator or heat exchanger 17. This cooler liquid then passes through the expansion valve 18 and becomes much cooler because the heat of vaporization extracts energy from the fluid. The process is then repeated.

It is therefore an object of this invention to provide a refrigeration apparatus which does not require the use of CFC working fluids.

Another object of the invention is to provide a refrigeration apparatus which does not require a compressor.

SUMMARY OF THE INVENTION

A magnetic fluid refrigeration apparatus is disclosed which does not require a compressor. The apparatus employs a working fluid comprising a suspension of particles in a base fluid, the particles characterized by a magnetic dipole moment. Such a working fluid may be a colloidal suspension of iron filing particles or bits of ceramic magnets. The working fluid is carried in a closed loop between a first region to be cooled by the apparatus and a second region to which heat from the fluid will be exchanged to the ambient.

Means are provided for pumping the working fluid to circulate the fluid in the conduit closed loop.

In accordance with the invention, the apparatus further comprises means for forcing alignment of the magnetic dipoles comprising the working fluid in the vicinity of said second region, thereby absorbing heat from and cooling the fluid. The apparatus further includes means for causing the magnetic dipoles to become randomly oriented in the vicinity of the first region, thereby taking up heat from said first region and warming said fluid.

In one embodiment, the means for forcing alignment of the magnetic dipoles comprises means for applying in the vicinity of the second region RF fields tuned to the resonance frequency of the dipoles.

In a second embodiment, the working fluid always operates at a temperature below the Curie temperature of the fluid, and the means for forcing alignment of the magnetic dipoles comprises a first conduit geometry in the vicinity of the second region which permits formation of a self-aligning magnetic field. The means for causing the magnetic dipoles to become randomly oriented comprises a second conduit geometry in the vicinity of the first region to be cooled which does not permit self-aligning magnetic fields to exist in the working fluid. The first conduit geometry may comprise, for example, a planar or cylindrical configuration. The second conduit geometry may comprise a spherical enclosure configuration.

The invention further includes a refrigeration method for cooling a space, comprising a sequence of the following steps:

circulating a working fluid in a fluid conduit through a closed loop between a first region to be cooled and a second region to which heat from the fluid will be exchanged to the ambient, wherein the working fluid is a suspension of particles in a base fluid, the particles characterized by a magnetic dipole moment; causing the magnetic dipoles to become randomly oriented in the vicinity of the first region, thereby taking up heat from the first region and warming the fluid; and forcing alignment of the magnetic dipoles in the vicinity of the second region, thereby absorbing heat from and cooling the fluid.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 2:
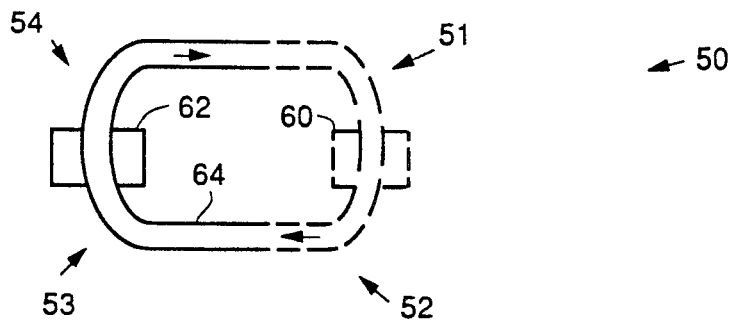
FIG. 2 is a simplified schematic diagram illustrating a refrigerator/air conditioning cycle of a refrigerator apparatus embodying the invention.

The operating cycle 50 of a magnetic fluid refrigerator in accordance with the invention is illustrated in simplified schematic form in FIG. 2. The refrigerator comprises a first heat exchanger 60 for exchanging heat with the region to be cooled, and a second heat exchanger or radiator 62 for exchanging heat with the ambient. A fluid conduit 64 conducts the working fluid, comprising a suspension of magnetic dipoles in a fluid base such as water, in a closed loop in a clockwise direction between the heat exchangers 60 and 62. The working fluid may comprise, for example, a colloidal suspension of little iron filings or particles of ceramic magnets. Each particle comprises many magnetic domains, i.e., regions in the magnetic material in which the magnetic dipoles are oriented in the same direction. Each domain comprises many magnetic dipoles.

In brief summary, the invention uses an external RF field and conduit geometry to cause alignment of the magnetic dipoles at operating temperatures above the Curie temperature of the magnetic materials. Self alignment phenomenon and conduit geometry cause alignment below the Curie temperature. Conduit geometry, such as a spherical volume region, is used to cause non-alignment of the dipoles above the Curie temperature.

The refrigeration apparatus operates in the following manner. In regions 51 and 52, the magnetic domains comprising the suspended particles or filing in the working fluid are randomly oriented, whereas in regions 53 and 54, they are aligned. Denoting by the magnitude of the magnetic moment and by H the alignment field, the heat of condensation (and/or vaporization) per molecule is then replaced by the energy of alignment, $E_c$.

$$E_c = \mu H \quad (1)$$

The alignment field can be due to an externally applied field $H_a$ and a self-alignment local field $H_l$, $$H = H_a + H_l \quad (2)$$

This local self-alignment field is related to the magnetization per unit volume M and to the geometry of the conduit in which the magnetic fluid is contained, $$H_l = \Gamma_B M \quad (3)$$

If there is no external alignment field, then self-alignment can occur for temperatures lower than the Curie temperature $T_c$. The Curie temperature can be estimated in various ways. For example, $H_l = \Gamma_B M$ can be combined with the Brillouin expression $$M = N\mu \tanh(\mu H/k_B T) \quad (4)$$

or with the Langevin expression $$M = N\mu [\coth(\mu H/k_B T) - (k_B T/\mu H)] \quad (5)$$

where N is the number of magnetic moments per unit volume and T is the temperature. In any case, the Curie temperature is given by the expression $$T_c = (\zeta N \mu^2 \Gamma_B / k_B) \quad (6)$$

where $\zeta$ is a numerical factor of order 1. (For the Langevin expression, $\zeta = \frac{1}{3}$.)

If $\mu$ is written $$\mu = \mu_B (l_{part}/l_{atom})^3 \quad (7)$$

where $\mu_B$ is the Bohr magneton, $l_{part}$ is the size of the magnetic particle in the fluid and $l_{atom}$ denotes an atomic dimension, then the last expression gives, on writing $N = L^{-3}$:

$$(l_{part}^6/L^3) = ((l_{atom}^6 k_B T_C)/(\zeta \mu_B \Gamma_B)) \quad (8)$$

For $T_c$ of the order of 300° K., this gives $L^3 = 10^{21} l_{part}^6$. Thus, for this case, possible fluid parameters are:

| | |
|---|---|
| for $l_{part} = 10^{-7}$ cm, | $L = 10^{-7}$ cm |
| for $l_{part} = 10^{-6}$ cm, | $L = 10^{-5}$ cm |
| for $l_{part} = 10^{-5}$ cm, | $L = 10^{-3}$ cm |

The self-alignment energy per magnetic moment is $\approx (k_B T_{Cl}/\zeta)$, which is not too much less than the conventional heat of condensation of 0.1 Ev.

It may be seen then, that a refrigeration method in accordance with the invention includes the following steps:

(i) circulating a working fluid in a fluid conduit through a closed loop between a first region to be cooled and a second region to which heat from the fluid will be exchanged to the ambient, and wherein the working fluid is a suspension of particles in a base fluid, the particles characterized by a magnetic dipole moment;

(ii) causing the magnetic dipoles to become randomly oriented in the vicinity of the first region, thereby taking up heat from the first region and warming the fluid; and (iii) forcing alignment of the magnetic dipoles in the vicinity of the second region, thereby absorbing heat from and cooling the fluid.

Two exemplary embodiments of a magnetic refrigerator embodying the invention are now described.

EMBODIMENT 1

Figure 3:
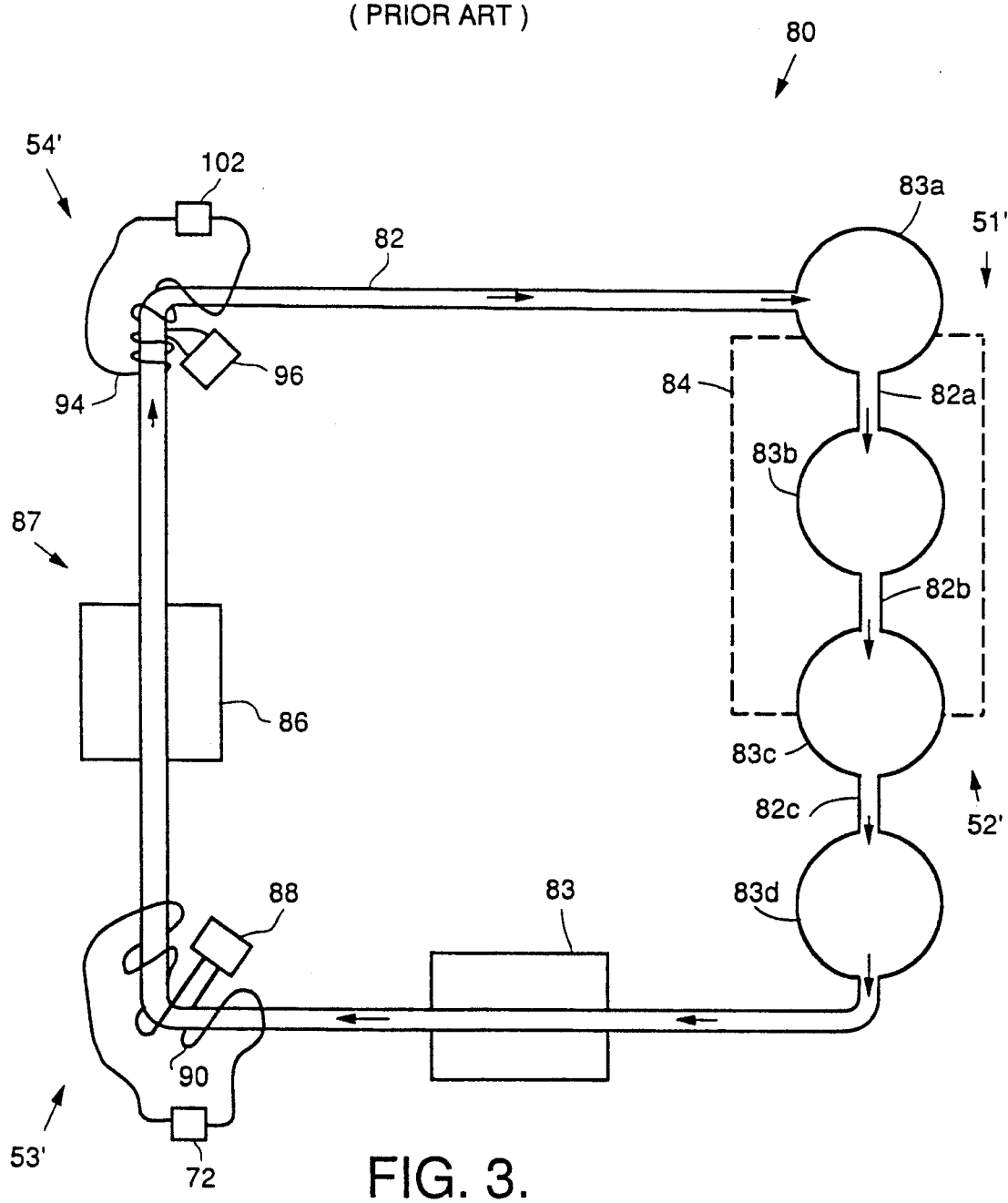
FIG. 3 is a simplified schematic drawing of a first exemplary embodiment of a refrigeration apparatus in accordance with the invention.

FIG. 3 shows in simplified schematic form a refrigeration apparatus 80, comprising a closed loop fluid conduit 82. The fluid conduit 82 comprises a tubular cylindrical member, fabricated, e.g., from PVC. However, in the regions 51' and 52' to be cooled, the geometry of the fluid conduit changes to the adjacent spherical enclosures 83A-D connected in series by a succession of short cylindrical conduit sections 82A-82C. Each spherical enclosure has an inlet port and an outlet port, allowing fluid to flow into the inlet port and out of the outlet port. This geometry is employed in the region to be cooled because it does not permit the magnetic dipoles to remain in an aligned state, whereas the cylindrical configuration of the conduit 82 in the vicinity of regions 53' and 54' does permit the dipoles to assume and maintain an aligned state. This is because the Γ in the Debye expression $H_l = \Gamma_B M$ (eq. 3), defining the alignment field M, really depends on the geometry of the container of the fluid. In Kittel's *Introduction to Solid State Physics*, 3rd Edition, N.Y., John Wiley & Sons (1967), p. 380, it is shown that:

| | |
|---|---|
| 1. $H = (4\pi/3) M$ | for a thin slab in which M is parallel to the surface; |
| 2. $H = -(8\pi/3) M$ | for a thin slab in which M is perpendicular to the surface; |
| 3. $H = (4\pi/3) M$ | for a thin slab in which M is perpendicular to the surface; and |
| 4. $H = 0$ | for a spherical enclosure. |

Self-alignment would occur for cases (1) and (3), but not for cases 2 and 4, even when $T < T_c$. A cylindrical pipe is not too different from cases 1 and 3; only the numerical factor differs.

A heat exchanger 84 exchanges heat from the region 85 to be cooled. A second heat exchanger 86 exchanges heat from the working fluid to the ambient region 87. A means for providing a static magnetic field $H_0$ at the respective regions 53' and 54' is provided. Such means may comprise permanent magnets 88 and 96. A means for applying an intermittent or pulsed RF field E to the regions 53' and 54' is also provided. In one form, such means could comprise, for example, coil 90 through which an AC current is passed by AC current source 92 for setting up the field in region 53', and coil 94 through which an AC current is passed by AC current source 102 for setting up the field in region 54. In this case, the portion of the conduit 82 passing through the coil 90 should be electrically non-conductive so that the RF field is not shielded from the dipoles comprising the working fluid. A typical conduit material is a plastic such as polyvinylchloride (PVC).

The RF field is applied for a sufficient time to orient the magnetic dipoles comprising the working fluid in the vicinity of the respective coil, and then turned off for a time interval before being applied again. Thus, the RF field is pulsed on and off.

A pump 83 circulates the working fluid through the conduit 82 in a clockwise direction.

In this case, alignment can be forced in cycle regions 53' and 54' by applying RF fields at the resonance frequency of the magnetic moments. In regions 53' and 54' a static field $H_0$ is applied, and an RF field E is applied to help align the moments at the resonance frequency $\omega_0 = \gamma H_0$, just as in paramagnetic resonance experiments. Thus, $\gamma$ is the ratio of magnetic moment to the angular-momentum, i.e., the gyromagnetic ratio.

EMBODIMENT 2

Figure 1:
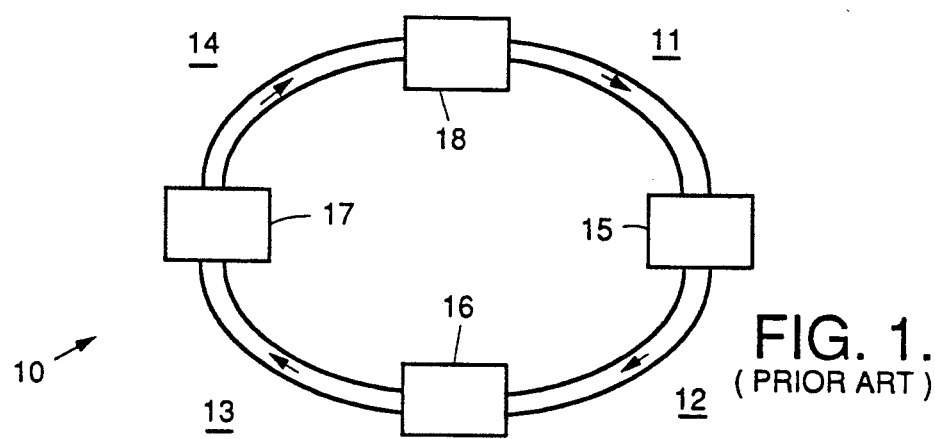
FIG. 1 is a simplified schematic diagram illustrating a conventional compressor refrigerator/air conditioning cycle.
Figure 4:
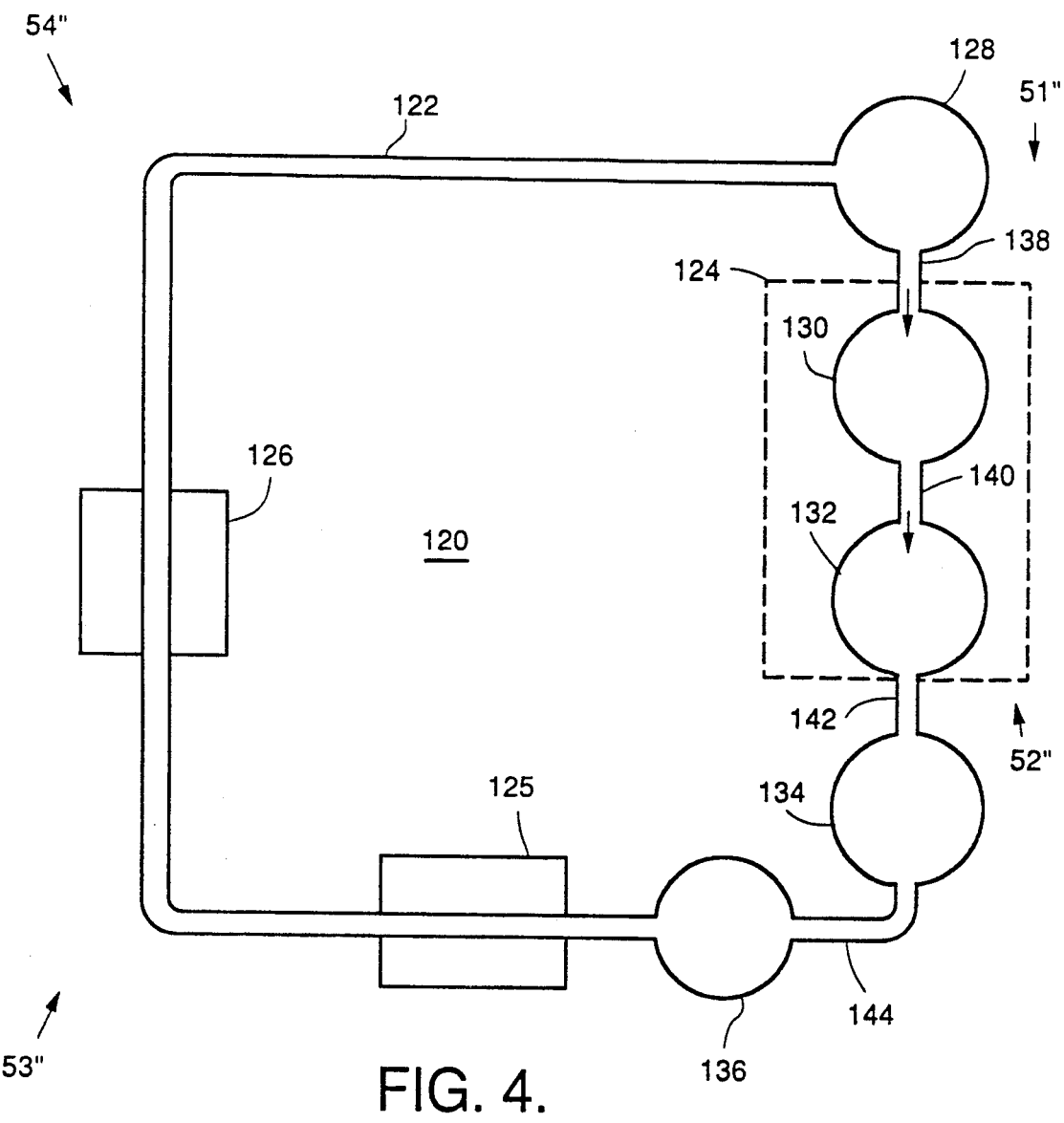
FIG. 4 is a simplified schematic drawing of a second exemplary embodiment of a refrigeration apparatus in accordance with the invention.

FIG. 4 shows a second embodiment of a refrigeration apparatus 120 in accordance with the invention. This apparatus 120 comprises a cylindrical or planar conduit 122, a first heat exchanger 124 for exchanging heat from the regions 51" and 52" to be cooled to the working fluid carried by the conduit, a pump 125 for circulating the working fluid through the conduit, and a second heat exchanger 126 for exchanging or radiating heat from the conduit 122 to the ambient in regions 53" and 54". It is not necessary to use heat exchanger 124, although it does facilitate the transfer of heat from regions 51" and 52" to the working fluid. In and adjacent the regions to be cooled, the conduit is characterized by a series of circular spherical enclosures 128, 130, 132, 134 connected in series by a succession of short cylindrical conduit sections 138, 140, 142 and 144. Each spherical enclosure has an inlet port and an outlet port, allowing fluid to flow into the inlet port and out of the outlet port. In this embodiment as well as the embodiment of FIG. 3, the short cylindrical conduits connecting adjacent spherical enclosures may be eliminated, so that the outlet port of one spherical enclosure directly communicates with the inlet port of the next adjacent spherical enclosure.

In this exemplary embodiment, alignment is accomplished solely by geometry of the conduits through which the working fluid flows. Thus, the cylindrical conduit configuration permits the magnetic dipoles to self-align and maintain the alignment, whereas the spherical configuration of enclosures 128, 130, 132 and 134 do not permit the magnetic dipoles to maintain alignment.

The refrigerator 120 operates at temperatures $T < T_c$. In regions 53" and 54", the conduit for the fluid is cylindrical or planar; whereas in regions 51" and 52", the conduits consist of a series of connected spheres. In the spherical containers, the local alignment field is zero, since surface currents create fields which exactly cancel the fields due to volume magnetization.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed:

1. A magnetic fluid refrigeration apparatus, comprising:
    a working fluid comprising a suspension of particles in a base fluid, said particles characterized by a magnetic dipole moment;
    fluid conduit means for carrying a working fluid in a closed loop between a first region to be cooled by the apparatus and a second region to which heat from said fluid will be exchanged to the ambient;
    means for pumping said fluid to circulate said fluid in said conduit closed loop;
    means for causing said magnetic dipoles to become randomly oriented in the vicinity of said first region, thereby taking up heat from said first region and warming said fluid; and
    means for forcing alignment of said magnetic dipoles in the vicinity of said second region, thereby absorbing heat from and cooling said fluid.

2. The refrigeration apparatus of claim 1 wherein said means for forcing alignment of said magnetic dipoles comprises means for applying in the vicinity of said second region RF fields tuned substantially to the resonance frequency of said dipoles.

3. The refrigeration apparatus of claim 1 further characterized in that said working fluid always operates at a temperature below the Curie temperature of said fluid, and wherein said means for forcing alignment of said magnetic dipoles comprises a first conduit geometry in the vicinity of said second region which permits formation of a self-aligning magnetic field, and said means for causing said magnetic dipoles to become randomly oriented comprises a second conduit geometry in the vicinity of said first region to be cooled which does not permit self-aligning magnetic fields to exist in said working fluid.

4. The refrigeration apparatus of claim 3 wherein said first conduit geometry comprises a planar or cylindrical configuration.

5. The refrigeration apparatus of claim 3 wherein said second conduit geometry comprises a spherical enclosure configuration.

6. The refrigeration apparatus of claim 1 wherein said working fluid comprises a colloidal suspension of small magnetic particles in a base fluid.

7. The refrigeration apparatus of claim 6 wherein said small magnetic particles comprise particles of iron.

8. The refrigeration apparatus of claim 6 wherein said small magnetic particles comprises ceramic magnet particles.

9. The refrigeration apparatus of claim 1 wherein said means for forcing alignment comprises means for applying electromagnetic energy in the vicinity of said second region and a first conduit geometry in the vicinity of said second region which permits alignment of magnetic dipoles in the working fluid.

10. The refrigeration apparatus of claim 1 wherein said means for causing said magnetic dipoles to become randomly oriented comprises a second conduit geometry in the vicinity of said first region which does not permit alignment of magnetic dipoles in said working fluid.

11. A refrigeration method for cooling a space, comprising a sequence of the following steps:
    circulating a working fluid in a fluid conduit through a closed loop between a first region to be cooled and a second region to which heat from said fluid will be exchanged to the ambient, and wherein said working fluid comprising a suspension of particles in a base fluid, said particles characterized by a magnetic dipole moment;
    causing said magnetic dipoles to become randomly oriented in the vicinity of said first region, thereby taking up heat from said first region and warming said fluid; and
    forcing alignment of said magnetic dipoles in the vicinity of said second region, thereby absorbing heat from and cooling said fluid.

12. The refrigeration method of claim 11 wherein said step of forcing alignment of said magnetic dipoles comprises applying RF fields in the vicinity of said second region which are tuned substantially to the resonance frequency of said dipoles.

13. The refrigeration method of claim 11 further characterized in that said working fluid always operates at a temperature below the Curie temperature of said fluid, and wherein said step of forcing alignment of said magnetic dipoles comprises circulating said working fluid through a first conduit geometry in the vicinity of said second region which permits formation of a self-aligning magnetic field, and said step of causing said magnetic dipoles to become randomly oriented comprises circulating said working fluid through a second conduit geometry in the vicinity of said first region to be cooled which does not permit self-aligning magnetic fields to exist in said working fluid.

14. The refrigeration method of claim 13 wherein said first conduit geometry comprises a planar or cylindrical configuration.

15. The refrigeration method of claim 13 wherein said second conduit geometry comprises a spherical enclosure configuration.

16. The refrigeration method of claim 11 wherein said working fluid comprises a colloidal suspension of small magnetic particles in a base fluid.

17. The refrigeration method of claim 16 wherein said small magnetic particles comprise particles of iron.

18. The refrigeration method of claim 16 wherein said small magnetic particles comprises ceramic magnet particles.

19. The refrigeration method of claim 9 wherein said step of forcing alignment includes the steps of applying electromagnetic energy in the vicinity of said second region and circulating said working fluid through a first conduit geometry in the vicinity of said second region which permits alignment of the magnetic dipoles in the working fluid.

20. The refrigeration method of claim 9 wherein the step of causing said magnetic dipoles to become randomly oriented comprises circulating said working fluid through a second conduit geometry in the vicinity of said first region which does not permit alignment of the magnetic dipoles in the working fluid.

* * * * *